United States Patent
Sugiyama et al.

(10) Patent No.: US 11,607,865 B2
(45) Date of Patent: Mar. 21, 2023

(54) LAMINATE, PACKAGE, AND PACKAGED ARTICLE

(71) Applicant: TOPPAN PRINTING CO., LTD., Tokyo (JP)

(72) Inventors: Yuki Sugiyama, Tokyo (JP); Satoru Ishida, Tokyo (JP); Ryo Hirose, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 0 days.

(21) Appl. No.: 16/791,603

(22) Filed: Feb. 14, 2020

(65) Prior Publication Data
US 2020/0262628 A1    Aug. 20, 2020

Related U.S. Application Data

(63) Continuation of application No. PCT/JP2018/024433, filed on Jun. 27, 2018.

(30) Foreign Application Priority Data

Oct. 3, 2017  (JP) .............................. JP2017-193585

(51) Int. Cl.
*B32B 7/12*    (2006.01)
*B32B 15/085*  (2006.01)
(Continued)

(52) U.S. Cl.
CPC .............. *B32B 7/12* (2013.01); *B32B 15/085* (2013.01); *B32B 15/09* (2013.01); *B32B 15/20* (2013.01);
(Continued)

(58) Field of Classification Search
CPC ......... B32B 7/12; B32B 27/325; B32B 15/20; B32B 15/085; B32B 15/09; B32B 27/36;
(Continued)

(56) References Cited

U.S. PATENT DOCUMENTS 10,934,070 B2 *  3/2021  Riis ................... A61K 31/4468
2006/0165928 A1  7/2006  Suzuki et al.
(Continued)

FOREIGN PATENT DOCUMENTS

JP    2007-291364    11/2007
JP    2008-207823     9/2008
(Continued)

OTHER PUBLICATIONS

TOPAS (R) COC, Polyplastics [online], Date Uncertain [retrieved: Sep. 6, 2018] <URL:http://www.polyplastics.com/jp/product/lines/topas/index.html>, (TOPAS® COC, Polyplastics, Product Lines).
(Continued)

*Primary Examiner* — James C Yager (57) ABSTRACT

Provided is a laminate including a base material layer, an adhesive layer having a thickness in a range of 0.1 μm to 1.0 μm, and a non-oriented sealant layer having a thickness in a range of 10 μm to 40 μm and made of a cyclic polyolefin resin, wherein one main surface of the sealant layer constitutes an outermost surface of the laminate, the other main surface of the sealant layer is bonded to the base material layer via the adhesive layer, and an adhesion strength between the base material layer and the sealant layer is 0.8 N/15 mm or more.

3 Claims, 1 Drawing Sheet

(51) Int. Cl.
  *B32B 15/09* (2006.01)
  *B32B 15/20* (2006.01)
  *B32B 27/32* (2006.01)
  *B32B 27/36* (2006.01)
  *B65D 65/40* (2006.01)

(52) U.S. Cl.
  CPC ............ *B32B 27/325* (2013.01); *B32B 27/36* (2013.01); *B65D 65/40* (2013.01); *B32B 2255/10* (2013.01); *B32B 2255/20* (2013.01); *B32B 2439/00* (2013.01)

(58) Field of Classification Search
  CPC ........... B32B 2255/10; B32B 2255/20; B32B 2439/00; B32B 15/08; B32B 2250/24; B32B 2255/26; B32B 2307/514; B32B 2307/5825; B32B 2307/7242; B32B 2307/732; B32B 2435/02; B32B 2439/70; B32B 2439/80; B32B 27/34; B32B 27/38; B32B 7/10; B32B 25/08; B32B 27/00; B32B 27/08; B32B 27/16; B32B 27/306; B32B 27/308; B32B 27/32; B32B 27/327; B32B 27/40; B65D 65/40
  See application file for complete search history.

(56) References Cited

U.S. PATENT DOCUMENTS

| | | | |
|---|---|---|---|
| 2009/0110888 A1* | 4/2009 | Wuest | B32B 27/08 |
| | | | 428/200 |
| 2015/0125098 A1 | 5/2015 | Okamoto et al. | |
| 2017/0174405 A1 | 6/2017 | Riis et al. | |

FOREIGN PATENT DOCUMENTS

| | | |
|---|---|---|
| JP | 2012-86876 | 5/2012 |
| JP | 2012-149121 | 8/2012 |
| JP | 2012-236382 | 12/2012 |
| JP | 2013-39938 | 2/2013 |
| JP | 2013-248744 A | 12/2013 |
| JP | 2014-157798 A | 8/2014 |
| JP | 2017-162830 A | 9/2017 |
| WO | 2004-080370 | 9/2004 |
| WO | 2013-105524 | 7/2013 |

OTHER PUBLICATIONS

International Search Report dated Sep. 18, 2018, in corresponding International Patent Application No. PCT/JP2018/024433.
Written Opinion of the International Searching Authority dated Sep. 18, 2018, in corresponding International Patent Application No. PCT/JP2018/024433.
International Preliminary Report on Patentability dated Apr. 8, 2020, in corresponding International Patent Application No. PCT/JP2018/024433.
Extended European Search Report dated May 18, 2021 in related European Application No. 18864602.0 (7 pages).
Notification of the First Office Action dated Oct. 27, 2021 in corresponding Chinese Patent Application No. 201880064477.2 (6 pages) (10 pages English Translation).
Keiichi Hamaguchi, "Process Technique of Laminate Film"; 1$^{st}$ printing, Nippo Co., Ltd., Apr. 12, 1990; pp. 206-209 (4 pages).
First Office Action dated Aug. 23, 2022 in corresponding Japanese Patent Application No. 2019-546535 (5 pages) (6 pages English Translation).
First Office Action dated Jan. 10, 2023 in corresponding Japanese Patent Application No. 2019-546535 (5 pages) (4 pages English Translation).
Communication under Rule 114(2) EPC; "observations by a third party concerning patentability," dated Jan. 26, 2023 in corresponding European Patent Application No. 18864602.0 (13 pages).

* cited by examiner

F I G. 1

F I G. 2

LAMINATE, PACKAGE, AND PACKAGED ARTICLE

CROSS-REFERENCE TO RELATED APPLICATION

This application is a Continuation Application of PCT Application No. PCT/JP2018/024433, filed Jun. 27, 2019 and based upon and claiming the benefit of priority from prior Japanese Patent Application No. 2017-193585, filed Oct. 3, 2017, the entire contents of all of which are incorporated herein by reference.

BACKGROUND

1. Field

The present invention relates to a laminate, a package, and a packaged article.

2. Description of the Related Art

In a laminate used as a packaging material, etc., a thermoplastic resin is used for its sealant layer. In particular, a polyethylene resin, polypropylene resin, or the like is used as the thermoplastic resin, from the viewpoint of having excellent lamination processability and heat-sealing properties.

However, while these resins can achieve high adhesion strength in heat sealing, they tend to adsorb components contained in foods, medicines, etc. Therefore, a package including a sealant layer made of such a resin so as to be adjacent to a space for containing a package content is liable to deteriorate or degrade the package content.

For this reason, polyacrylonitrile resin, which is a non-adsorbing material, has been used for sealant layers in laminates used for packaging of foods and medicines. However, it is difficult to procure polyacrylonitrile resin films stably, and there is a need to find substitute materials for polyacrylonitrile resins.

Jpn. Pat. Appln. KOKAI Publication No. 2008-207823 describes a packaging bag that has a suitability for high-speed-filling and packaging and has an extremely small adsorption of volatile components derived from the package content. This packaging bag is formed of a laminated material in which a base material layer, a low-density polyethylene resin layer, and a cyclic polyolefin resin composition layer are laminated in this order. This document adopts a structure in which a thickness ratio of the low-density polyethylene resin layer to the cyclic polyolefin resin composition layer is in a range of 20:1 to 2:1. With this structure, high-speed filling of a content is possible.

The invention described in Jpn. Pat. Appln. KOKAI Publication No. 2012-86876 aims to provide a packaging bag and a packaging container each having a sealant layer excellent in film-forming property, non-adsorbing property, and heat-sealing property. This document describes, in order to achieve the above-mentioned object, using, for a lid member of the packaging bag or packaging container, a laminate in which a base material layer, a linear low-density polyethylene resin layer, and a cyclic polyolefin resin composition layer are stacked in this order, and the cyclic polyolefin resin composition has a predetermined composition. In this invention, as the sealant layer, a linear low-density polyethylene resin and a cyclic polyolefin resin composition are used.

SUMMARY

An object of the present invention is to provide a laminate excellent in non-adsorbing property and excellent in adhesion strength between a base material layer and a sealant layer, despite the fact that an adhesive layer between the base material layer and the sealant layer is thin.

According to a first aspect of the present invention, there is provided a laminate comprising: a base material layer; an adhesive layer having a thickness in a range of 0.1 µm to 1.0 µm; and a non-oriented sealant layer having a thickness in a range of 10 µm to 40 µm and made of a cyclic polyolefin resin, wherein one main surface of the sealant layer constitutes an outermost surface of the laminate, the other main surface of the sealant layer is bonded to the base material layer via the adhesive layer, and an adhesion strength between the base material layer and the sealant layer is 0.8 N/15 mm or more.

According to a second aspect of the present invention, there is provided a package comprising the laminate according to the first aspect such that the sealant layer is adjacent to a space for containing a content.

According to a third aspect of the present invention, there is provided a packaged article comprising: the package according to the second aspect; and a content contained in the package.

DETAILED DESCRIPTION

Hereinafter, embodiments of the present invention will be described below with reference to the drawings.

Figure 1:
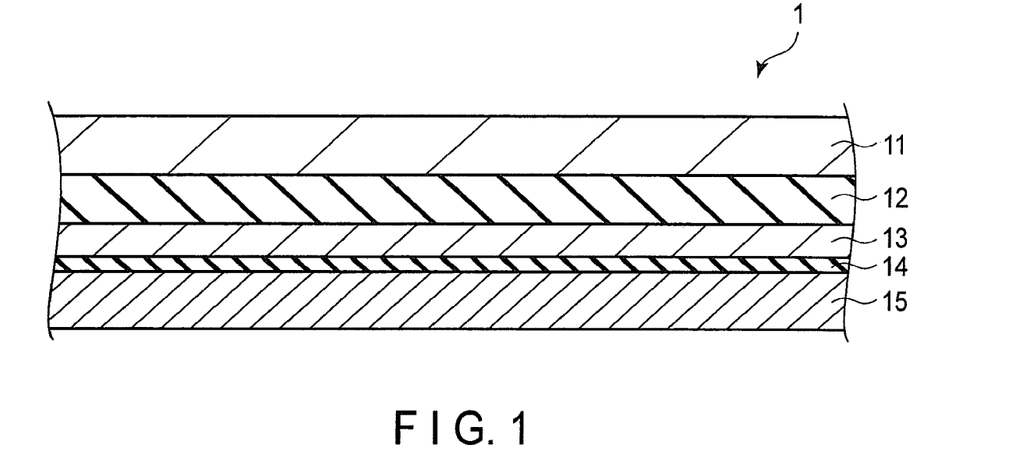
FIG. 1 is a cross-sectional view schematically showing a laminate according to an embodiment of the present invention.

FIG. 1 is a cross-sectional view schematically showing a laminate according to an embodiment of the present invention. A laminate 1 shown in FIG. 1 is used, for example, as a packaging material. The laminate can also be used for applications other than packaging materials, for example, as a cover film covering the surface of a push button of an electronic device.

The laminate 1 includes a base material layer 11, an adhesive resin layer 12, a barrier layer 13, an adhesive layer 14, and a sealant layer 15.

The base material layer 11 is, for example, a sheet of paper, a resin film, or a combination thereof. As the resin film, a biaxially oriented polypropylene film, a biaxially oriented polyester film, a biaxially oriented nylon film, or a cellophane film can be used, for example.

A printed layer may be provided on a main surface of the base material layer 11. The printed layer may be provided on one of main surfaces of the base material layer 11 on the barrier layer 13 side, may be provided on the back surface of the base material layer 11, or may be provided on both of them.

The adhesive resin layer 12 is interposed between the base material layer 11 and the barrier layer 13. The adhesive resin layer 12 bonds the base material layer 11 and the barrier layer 13 together. The adhesive resin layer 12 contains, for example, a polyolefin resin such as low-density polyethylene (LDPE) and linear low-density polyethylene (LLDPE).

An adhesive layer (not shown) containing an adhesive may be interposed between the base material layer 11 and the adhesive resin layer 12. In this case, the adhesive layer is obtained by applying a two-liquid polyurethane adhesive, etc. onto the main surface of the base material layer 11. The adhesive layer further strengthens the adhesion between the base material layer 11 and the adhesive resin layer 12.

Instead of providing the adhesive resin layer 12, the base material layer 11 and the barrier layer 13 may be bonded with use of an adhesive to be described later.

The barrier layer 13 adheres to one main surface of the base material layer 11 via the adhesive resin layer 12. The barrier layer 13 suppresses permeation of gases, such as water vapor and oxygen, through the laminate 1.

The barrier layer 13 is, for example, a layer including an aluminum layer or an inorganic oxide thin film.

For example, the barrier layer 13 is aluminum foil, an aluminum vapor deposition film, or a transparent vapor deposition film.

A thickness of the aluminum foil is preferably in a range of 5 μm to 15 μm, and more preferably in a range of 5 μm to 9 μm. If the aluminum foil is too thin, handling at the time of bonding it to the base material layer 11 is difficult. If the thickness of the aluminum foil is increased excessively, the barrier property cannot be expected to improve with an increase in thickness, resulting in a high cost. Additionally, in this case, the flexibility of the laminate 1 degrades, and it becomes difficult to handle the laminate 1.

The aluminum vapor deposition film is a film in which an aluminum layer is vapor-deposited on a resin film.

The resin film is, for example, a biaxially oriented polyester film, a biaxially oriented nylon film, or a biaxially oriented polypropylene film. A thickness of the resin film is not particularly limited, but is preferably in a range of 3 μm to 200 μm, and more preferably in a range of 6 μm to 30 μm.

A thickness of the aluminum vapor deposition layer is preferably in a range of 5 nm to 100 nm. If the aluminum vapor deposition layer is too thin, it may not be possible to sufficiently prevent the entry of gases such as water vapor and oxygen. A thick aluminum vapor deposition layer is not only expensive, but also tends to cause cracks in the deposited layer, which may lead to a degradation in barrier property.

The transparent vapor deposition film is a film in which an inorganic oxide thin film is formed on a resin film by means of a vacuum evaporation method or sputtering method.

As the resin film of the transparent vapor deposition film, the same film as those illustrated for the resin film of the aluminum vapor deposition film can be used.

The inorganic oxide thin film is made of, for example, an inorganic oxide, such as a silicon oxide, aluminum oxide, and magnesium oxide. Most of inorganic oxide thin film layers are colorless or very thinly colored transparent layers, and thus, the transparent vapor deposition film is suitable when the laminate 1 is required to have transparency. Furthermore, since the inorganic oxide thin film transmits microwaves, unlike metal layers, the laminate 1 including the transparent vapor deposition film as the barrier layer 13 can also be used for packaging materials of foodstuffs which are heated with a microwave oven.

A thickness of the inorganic oxide thin film is preferably in a range of 5 nm to 300 nm, and more preferably in a range of 10 nm to 150 nm. If the inorganic oxide thin film is too thin, a uniform film may not be obtained or the thickness may not be sufficient, and the function as the barrier layer 13 may not be sufficiently fulfilled. If the inorganic oxide thin film is too thick, the inorganic oxide thin film may be cracked when the laminate 1 is bent or has tension applied.

As the transparent vapor deposition film, for example, commercially available products such as trade name "GL FILM" and "PRIME BARRIER (registered trademark)" (all are manufactured by TOPPAN PRINTING CO., LTD.) can be used.

The aluminum vapor deposition layer and the inorganic oxide thin film may be formed on the base material layer 11. The adhesive resin layer 12 and the barrier layer 13 may be omitted when the base material layer 11 contains a resin film.

The sealant layer 15 is non-oriented and adheres to one main surface of the barrier layer 13 via the adhesive layer 14. Preferably, the sealant layer 15 is in direct contact with the adhesive layer 14. The sealant layer 15 imparts a heat-sealing property to the laminate 1. The sealant layer 15 plays a role of enhancing a non-adsorbing property of the laminate 1 in addition to imparting the heat-sealing property to the laminate 1.

The sealant layer 15 is made of a cyclic polyolefin resin. The cyclic polyolefin resin is preferably a ring-opening metathesis polymerization product (COP) obtained by a ring-opening metathesis polymerization of cyclic olefin, a copolymer of cyclic olefin and α-olefin (chain olefin), i.e., a cyclic olefin copolymer (COC), or a mixture thereof.

As the cyclic olefin, any cyclic hydrocarbon having an unsaturated hydrocarbon and a bicyclo ring can be used. The cyclic olefin is particularly preferably one having a bicyclo [2.2.1] hept-2-ene (norbornene) skeleton.

As the cyclic polyolefin resin obtained from the cyclic olefin having a norbornene skeleton, for example, a ring-opening metathesis polymer of a norbornene monomer can be used. Examples of commercially available products of such a ring-opening metathesis polymer product include "ZEONOR (registered trademark)" manufactured by ZEON CORPORATION. As the cyclic polyolefin resin obtained from the cyclic olefin having a norbornene skeleton, for example, a norbornene COC can be used. Examples of such commercially available COC products include "APEL (registered trademark)" manufactured by MITSUI CHEMICALS, INC., and "TOPAS (registered trademark)" manufactured by TOPAS ADVANCED POLYMERS GmbH and sold by POLYPLASTICS CO., LTD.)".

Suitable cyclic polyolefin resins have a glass transition temperature, for example, in a range of 60° C. to 100° C.

As the cyclic polyolefin resin, for example, a copolymer obtained by copolymerizing ethylene and norbornene, using a metallocene catalyst, can be suitably used. As the copolymer obtained by copolymerizing ethylene and norbornene using a metallocene catalyst, it is possible to use a copolymer containing a repeating unit represented by formula (a) and a repeating unit represented by formula (b). An example of a commercially available product of such a cyclic polyolefin resin is "TOPAS (registered trademark)" manufactured by TOPAS ADVANCED POLYMERS GmbH and sold by POLYPLASTICS CO., LTD.

(a)

(b)

The sealant layer 15 may further contain an additive. The sealant layer may contain an additive as a discretional component. The additive is, for example, one or more of a lubricant, an antioxidant, an ultraviolet light absorber, a light stabilizer, an antistatic agent, an anti-blocking agent, a flame retardant, a crosslinking agent, and a colorant. As the lubricant, for example, a higher fatty acid metal salt, aliphatic alcohol, polyglycol, triglyceride, wax, a phenolic compound, or a mixture containing one or more of these, may be suitably used for the purpose of improving the processability. The wax may be a natural-substance-derived wax, for example, a mineral wax such as Montan wax, or a synthetic wax such as polyethylene wax.

A thickness of the sealant layer 15 is in a range of 10 µm to 40 µm. The thickness of the sealant layer 15 is preferably in a range of 15 µm to 40 µm, and more preferably in a range of 30 µm to 40 µm. If the thickness of the sealant layer 15 is excessively reduced, sufficient initial seal strength may not be achieved, or degradation in seal strength during a long-term storage may become remarkable. If the thickness of the sealant layer 15 is excessively increased, in many applications, it will be overdesigned and disadvantageous in cost.

With respect to the sealant layer 15, a size of a polymer free volume Vf obtained by a positron annihilation lifetime measurement method is preferably in a range of 0.10 $nm^3$ or less. The present inventors found a correlation between the polymer free volume obtained by the positron annihilation lifetime measurement method and a non-adsorbing property. When the polymer free volume Vf obtained by the positron annihilation lifetime measurement method exceeds 0.10 $nm^3$, there is a possibility that a desired non-adsorbing property cannot be obtained. The positron annihilation lifetime measurement method will be described in detail later.

The adhesion strength between the sealant layer 15 and the base material layer 11 is 0.8 N/15 mm or more, preferably 1.0 N/15 mm or more, more preferably 1.7 N/15 mm or more, further preferably, 3.0 N/15 mm or more. When the adhesion strength between the base material layer 11 and the sealant layer 15 is small, a sufficient seal strength may not be achieved. When the adhesion strength between the base material layer 11 and the sealant layer 15 is excessively large, in many applications, it will be overdesigned and disadvantageous in cost. The adhesion strength is, for example, 4.0 N/15 mm or less.

The adhesive layer 14 is interposed between the barrier layer 13 and the sealant layer 15 and bonds the barrier layer 13 and the sealant layer 15. The adhesive layer 14 is made of an adhesive.

The adhesive is, for example, one or more of a solvent-type adhesive, a water-based adhesive, a reaction-type adhesive, and a hot-melt adhesive.

The solvent-type adhesive is an adhesive which uses an organic solvent as a solvent. The solvent-type adhesive is, for example, a vinyl acetate solvent-type adhesive, a rubber solvent-type adhesive, an ether solvent-type adhesive, a polyester solvent-type adhesive, or a polyolefin solvent-type adhesive.

The water-based adhesive is an adhesive which uses water as a solvent. The water-based adhesive is, for example, a vinyl acetate resin water-based adhesive, a vinyl acetate copolymer resin water-based adhesive, an acrylic resin water-based adhesive, an epoxy resin water-based adhesive, or a nitrile rubber water-based adhesive.

The reaction-type adhesive is an adhesive which becomes hardened by a chemical reaction. The reaction-type adhesive is, for example, an epoxy resin adhesive or a polyurethane adhesive. The polyurethane adhesive may be a one-part polyurethane adhesive or a two-part polyurethane adhesive which is used in the form of a mixture obtained by mixing a base compound having a hydroxy group and a hardening agent having an isocyanate group. The polyurethane adhesive is preferably a two-part polyurethane adhesive.

The hotmelt adhesive is an adhesive which is melted by applying heat thereto and thereafter is solidified by cooling. The hot-melt adhesive is, for example, a polyamide resin adhesive or a polyester adhesive.

The adhesive used for the adhesive layer 14 is preferably a two-part polyurethane adhesive. It is possible for the two-part polyurethane adhesive to achieve high adhesion strength by subjecting the sealant layer to ozone treatment in the production.

The adhesive may be at least one of an anchor coating agent and a dry lamination adhesive. The viscosity of an anchor coating agent is lower than that of a dry lamination adhesive. Therefore, when an anchor coating agent is used, a thickness of the adhesive layer 14 can be reduced as compared with the case where a dry lamination adhesive is used.

The thickness of the adhesive layer 14 is in a range of 0.1 µm to 1.0 µm, preferably in a range of 0.3 µm to 1.0 µm, and more preferably in a range of 0.5 µm to 1.0 µm. If the thickness of the adhesive layer 14 is excessively reduced, a sufficient seal strength may not be achieved. If the thickness of the adhesive layer 14 is excessively increased, in many applications, it will be overdesigned and disadvantageous in cost.

It should be noted that the adhesive resin layer 12 and the barrier layer 13 may be omitted. When the adhesive resin layer 12 and the barrier layer 13 are omitted, the adhesive layer 14 is interposed between the base material layer 11 and the sealant layer 15 to bond the base material layer 11 and the sealant layer 15.

The laminate 1 adopts the above-mentioned configuration for the base material layer 11, the adhesive layer 14, and the sealant layer 15. Therefore, the laminate 1 hardly causes adsorption by the sealant layer 15, has high adhesion strength in spite of the thin adhesive layer 14 between the base material layer 11 and the sealant layer 15, and hardly causes delamination of them.

Hereinafter, an example of a method for producing a laminate according to an embodiment of the present invention will be explained.

Figure 2:
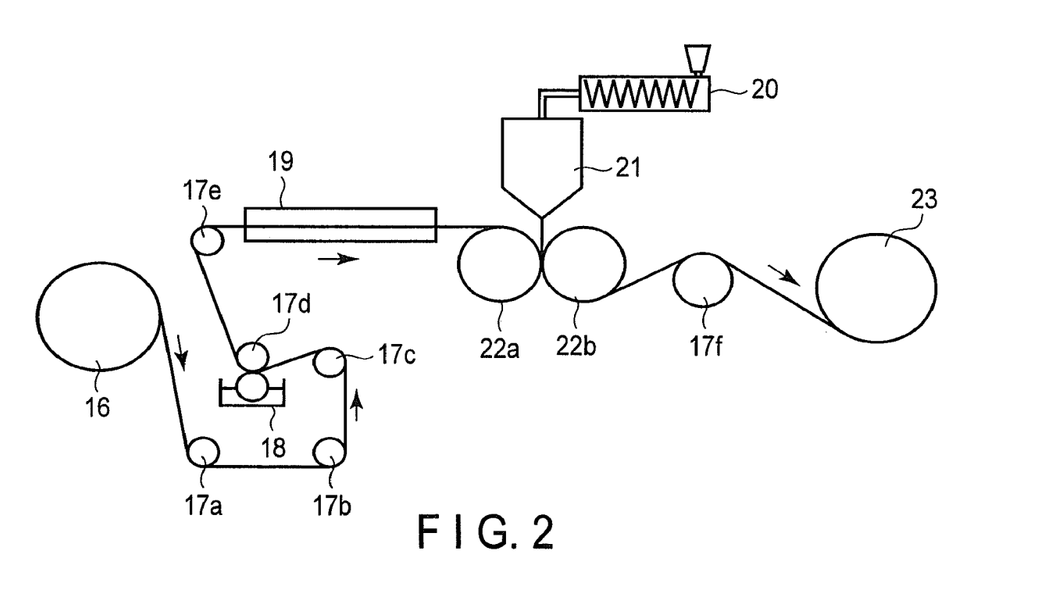
FIG. 2 is a view schematically showing a method for producing a laminate according to an embodiment of the present invention.

FIG. 2 is a view schematically showing a method for producing a laminate according to an embodiment of the present invention.

In the method shown in FIG. 2, a laminate is produced by a roll-to-roll method.

Specifically, first, an unwind roll 16 unwinds a base material layer 11. The unwound base material layer 11 is guided from the unwind roll 16 to an adhesive application unit 18 by guide rolls 17a, 17b and 17c, and passes through the adhesive application unit 18.

The adhesive application unit 18 applies an adhesive to one main surface of the base material layer 11. When an adhesive is applied to the main surface of the base material layer 11, an adhesive layer 14 is formed on the base material layer 11. Hereinafter, a laminate including the base material layer 11 and the adhesive layer 14 is referred to as a first laminate.

The first laminate is guided from the adhesive application unit 18 to a drying furnace 19 by guide rolls 17d and 17e and then passes through the drying furnace 19. The drying furnace 19 dries the first laminate.

The dried first laminate is next conveyed between a nip roll 22a and a cooling roll 22b facing each other.

The material of the sealant layer 15 is supplied to a T die 21 from an extrusion unit 20. The T die 21 supplies the material of the sealant layer 15 to the gap. By this supply, the sealant layer 15 is formed on the adhesive layer 14.

The laminate supplied with the material of the sealant layer 15 is cooled by the cooling roll 22b.

A laminate 1 is obtained in this way.

The laminate 1 is then guided to a wind-up roll 23 by a guide roll 17f. The wind-up roll 23 winds up the laminate 1.

It should be noted that instead of providing the adhesive layer 14 on one main surface of the base material layer 11, the adhesive layer 14 may be provided on the surface of the barrier layer 13 of a laminate which includes the base material layer 11, the adhesive resin layer 12, and the barrier layer 13 in this order.

Further, it is preferable to subject the material of the sealant layer 15 to be extruded to ozone treatment prior to lamination.

Next, another example of the method for producing the laminate 1 will be described.

First, a base material layer 11 is prepared, and a two-part polyurethane adhesive is applied to one main surface of the base material layer 11 to form an adhesive layer.

Next, the raw material of an adhesive resin layer 12 is heated and melted, and the base material layer 11 and a barrier layer 13 are sandwich-laminated with the melted raw material interposed therebetween. At this time, the lamination is performed such that the adhesive layer formed on the base material layer 11 is in contact with the adhesive resin layer 12. The base material layer 11 and the barrier layer 13 may be bonded together by dry lamination.

Next, an adhesive is applied onto the barrier layer 13 to form an adhesive layer 14.

Next, a sealant layer 15 is formed on the adhesive layer 14 by an extrusion laminating method. At this time, it is preferable to subject a cyclic polyolefin resin to be extruded to ozone treatment prior to the lamination.

It should be noted that when the adhesive resin layer 12 and the barrier layer 13 are omitted from the laminate 1, the sealant layer 15 is formed on the base material layer 11 by an extrusion laminating method.

A laminate 1 is obtained in the manner described above.

According to this method, the laminate 1 can be produced at a lower cost as compared with a method of separately forming a sealant layer 15 and then laminating the same.

As described above, the laminate 1 can be used as a packaging material, for example. In this case, a package including the packaging material includes the above-described laminate 1 such that the sealant layer 15 is adjacent to a space for containing the content. The package may be a bag, or may be a container including a container body having an opening and a lid closing the opening. In the latter case, the laminate 1 can be used as at least a part of a lid.

In a packaged article including the package and the content contained therein, any contents may be employed. According to an example, the content is a medicine such as a patch. Specifically, the content is an article containing one or more of 1-menthol, DL-camphor, tulobuterol and lidocaine, for example. According to another example, the content is a cosmetic or a food.

In this packaged article, the sealant layer 15 in the laminate 1 hardly permeates medical components, etc., and delamination attributable to permeation of medical components, etc. occurs very little. In addition, in the laminate 1, the adhesive layer 14 between the base material layer 11 and the sealant layer 15 has a high strength, and delamination between the layers hardly occurs in spite of the fact that the adhesive layer 14 is thin. Therefore, the performance degradation of the laminate 1 attributable to delamination, etc. occurs very little, even if the package is stored in a sealed state for a long period of time. Furthermore, since the sealant layer 15 causes very little adsorption, components contained in the content, for example, a liquid or paste component, are adsorbed very little to the sealant layer 15. That is, this packaged article causes very little deterioration of the content thereof.

Hereinafter, examples of a laminate according to the present invention will be described.

(1) An embodiment of the present invention is a laminate comprising: a base material layer; an adhesive layer having a thickness in a range of 0.1 μm to 1.0 μm; and a non-oriented sealant layer having a thickness in a range of 10 μm to 40 μm and made of a cyclic polyolefin resin, wherein one main surface of the sealant layer constitutes an outermost surface of the laminate, the other main surface of the sealant layer is bonded to the base material layer via the adhesive layer, and an adhesion strength between the base material layer and the sealant layer is 0.8 N/15 mm or more.

(2) Another embodiment of the present invention is the laminate according to (1) further comprising a barrier layer between the base material layer and the adhesive layer.

(3) Another embodiment of the present invention is the laminate according to (2), wherein the barrier layer includes a layer including an aluminum layer or an inorganic oxide thin film.

(4) Another embodiment of the present invention is the laminate according to (2) or (3), further comprising an adhesive resin layer between the base material layer and the barrier layer.

(5) Another embodiment of the present invention is the laminate according to (4), wherein the adhesive resin layer includes polyethylene.

(6) Another embodiment of the present invention is the laminate according to any one of (1) to (5), wherein the sealant layer includes only a cyclic polyolefin resin as a resin.

(7) Another embodiment of the present invention is the laminate according to any one of (1) to (5), wherein the sealant layer includes only a cyclic polyolefin resin and a discretional additive.

(8) Another embodiment of the present invention is the laminate according to (7), wherein the additive is one or more of a lubricant, an antioxidant, an ultraviolet light absorber, a light stabilizer, an antistatic agent, an anti-blocking agent, a flame retardant, a crosslinking agent, and a colorant.

(9) Another embodiment of the present invention is the laminate according to (8), wherein the lubricant is a higher fatty acid metal salt, aliphatic alcohol, polyglycol, triglyceride, wax, a phenolic compound, or a mixture containing one or more of these.

(10) Another embodiment of the present invention is the laminate according to any one of (1) to (5), wherein the sealant layer includes only a cyclic polyolefin resin.

(11) Another embodiment of the present invention is the laminate according to any one of (1) to (10), wherein the adhesive layer is made of an adhesive, and the adhesive is one or more of a solvent-type adhesive, a water-based adhesive, a reaction-type adhesive, and a hot-melt adhesive.

(12) Another embodiment of the present invention is the laminate according to any one of (1) to (10), wherein the adhesive layer comprises a reaction-type adhesive, and the reaction-type adhesive is at least one of an epoxy resin adhesive and a polyurethane adhesive.

(13) Another embodiment of the present invention is the laminate according to (12), wherein the reaction-type adhesive is the polyurethane adhesive, and the polyurethane adhesive is a two-part polyurethane adhesive.

(14) Another embodiment of the present invention is the laminate according to any one of (1) to (13), wherein the base material layer is a biaxially oriented polyethylene terephthalate film.

(15) Another embodiment of the present invention is the laminate according to any one of (1) to (14), wherein the other main surface of the sealant layer is in direct contact with the adhesive layer.

(16) Another embodiment of the present invention is a package comprising the laminate according to any one of (1) to (15) such that the sealant layer is adjacent to a space for containing a content.

(17) Another embodiment of the present invention is a packaged article including: the package according to (16) and the content contained in the package.

Hereinafter, examples of a method for producing a laminate according to the present invention will be described.

(1) An embodiment of the present invention is a method for producing a laminate, comprising: forming an adhesive layer having a thickness in a range of 0.1 µm to 1.0 µm on a base material layer; and forming, on the adhesive layer, a non-oriented sealant layer having a thickness in a range of 10 µm to 40 µm and made of a cyclic polyolefin resin by extrusion lamination, wherein one main surface of the sealant layer constitutes an outermost surface of the laminate, and an adhesion strength between the base material layer and the sealant layer is 0.8 N/15 mm or more.

(2) Another embodiment of the present invention is the method for forming a laminate according to (1), wherein a process including the formation of the adhesive layer and the formation of the sealant layer is performed by a roll-to-roll method.

(3) Another embodiment of the present invention is the method for forming a laminate according to (1) or (2), further comprising providing a barrier layer on the base material layer before forming the adhesive layer on the base material layer, wherein the adhesive layer is formed on the barrier layer.

(4) Another embodiment of the present invention is the method for forming a laminate according to (3), wherein the barrier layer includes a layer including an aluminum layer or an inorganic oxide thin film.

Examples are described below.

Example 1

A laminate including a base material layer, a barrier layer, an adhesive layer, and a sealant layer was produced by the following method.

First, as the base material layer, a biaxially oriented polyethylene terephthalate film (PET) having a thickness of 12 µm was prepared. Specifically, "FE2001" manufactured by Futamura Chemical Co., Ltd. was prepared. In addition, an aluminum foil (Al) having a thickness of 7 µm was prepared as the barrier layer.

Next, a two-part polyurethane adhesive was applied to one main surface of the base material layer, and subsequently, the base material layer and the barrier layer were sandwich-laminated such that the main surface and the barrier layer faced each other with the adhesive resin layer interposed therebetween. Here, polyethylene (PE) was used as a material of the adhesive resin layer, and a thickness of the adhesive resin layer was adjusted to 15 µm.

Next, the two-part polyurethane adhesive (anchor coating agent A) was applied to the surface of the barrier layer so as to form an adhesive layer so as to have a thickness of 0.5 µm.

Next, the sealant layer was formed on the adhesive layer. Specifically, a non-oriented COC resin layer was formed on the adhesive layer by an extrusion laminating method. In the extrusion laminating method, ozone treatment was performed before the lamination.

As a material of the sealant layer, TOPAS (registered trademark) manufactured by TOPAS ADVANCED POLYMERS GmbH and sold by Polyplastics Co., Ltd. was used. This resin was found to have a melt flow rate of 1.8 g/10 min at 190° C. with a load of 21.168 N (=2.16 kgf), a density of 1.01 g/cm$^3$, and a glass transition temperature of about 80° C.

In addition, a thickness of the sealant layer was adjusted to 30 µm.

A laminate was obtained as described above.

With respect to the sealant layer of this laminate, a polymer free volume Vf was determined by a positron annihilation lifetime measurement method. As a result, the polymer free volume Vf was 0.09 nm$^3$.

Here, the positron annihilation lifetime measurement method is a technique in which a time period (in the order of several hundred ps to several tens of ns) from the entry of positrons in a sample to the annihilation of the positrons is measured, and information relating to the size of holes (about 0.1 nm to 10 nm) existing in the sample, a number density thereof, and distribution of sizes thereof is evaluated nondestructively from the annihilation lifetime. A radioisotope $^{22}$Na can be used as a radiation source of positrons.

In order to measure the positron annihilation lifetime of a polymer, first, a $^{22}$NaCl aqueous solution is sealed with a 1 cm×1 cm polyimide film to thereby prepare a positron radiation source sample. Next, the polymer is formed into a sheet so as to have a thickness of 0.5 to 1 mm, or a plurality of thin polymer films are stacked so as to have a total thickness of 0.5 to 1 mm. Thereafter, the formed film is cut out to have a size of 1 cm×1 cm to prepare a polymer sample. Furthermore, the positron radiation source sample is sandwiched by a pair of polymer samples, thereby obtaining a measurement sample.

The measurement sample is placed in a sample chamber under the condition of room temperature and in a vacuum, and a time difference between a γ-radiation start signal of 1.28 MeV, which is generated by radiolysis of $^{22}$Na as a radiation source and a γ-radiation stop signal of 511 keV, which is generated by the annihilation of positrons, is measured, and this measurement is repeated several million times or so. A decay curve, which is plotted by collecting statistics of time (ns) on a horizontal axis and collecting statistics of the number of counts on a vertical axis, includes a first component $\tau_1$ whose gradient of the decay is steep, a second component $\tau_2$ whose gradient of the decay is slightly gentle, a third component $\tau_3$ whose gradient of the decay is gentle, etc. If the decay curve is subjected to inverse Laplace transform, and then time (ns) is provided on the horizontal axis, and a probability density function is provided on the vertical axis, a distribution of a lifetime of each τ component, such as $\tau_1$, $\tau_2$, and $\tau_3$, appears as a peak.

The polymer free volume Vf is the volume of holes formed in amorphous portions of the polymer. These holes have a radius R on the order of several nm, assuming that each of them is spherical. The magnitude of the free volume Vf has an influence on the lifetime $\tau_3$ of ortho-positronium which is formed by conjugation between positrons and electrons by means of their mutual coulomb forces.

The relationship between the radius R (nm) of the polymer free volume Vf, assuming that each hole is spherical, and the lifetime $\tau_3$ (ns) of the ortho-positronium, is represented by the following Equation (1).

$$\tau_3 = \frac{1}{2}\left[1 - \frac{R}{R+0.166} + \frac{1}{2\pi}\sin\left(2\pi\frac{R}{R+0.166}\right)\right]^{-1} \quad \text{Equation (1)}$$

The radius R (nm) of the sphere-shaped polymer free volume Vf can be calculated from the Equation (1), and the polymerfree volume Vf (nm$^3$) can be calculated from the following Equation (2).

$$Vf = 4/3\pi R^3 \quad \text{Equation (2)}$$

Example 2

A laminate was produced by the same method as in Example 1 except that the adhesive layer was formed using a two-part polyurethane adhesive (anchor coating agent B).

Example 3

A laminate was produced by the same method as in Example 1 except that the adhesive layer was formed using a polyolefin adhesive (anchor coating agent C).

Example 4

A laminate was produced by the same method as in Example 1 except that the adhesive layer was formed using a polyolefin adhesive (anchor coating agent C), and the ozone treatment was not performed in the extrusion laminating method.

Example 5

A laminate was produced by the same method as in Example 1 except that the thickness of the sealant layer was adjusted to 40 μm.

Example 6

A laminate was produced by the same method as in Example 1 except that the thickness of the sealant layer was adjusted to 10 μm.

Example 7

A laminate was produced by the same method as in Example 1 except that the thicknesses of the adhesive layer and the sealant layer were adjusted to 0.1 μm and 40 μm, respectively.

Example 8

A laminate was produced by the same method as in Example 1 except that the thicknesses of the adhesive layer and the sealant layer were adjusted to 0.1 μm and 30 μm, respectively.

Example 9

A laminate was produced by the same method as in Example 1 except that the thicknesses of the adhesive layer and the sealant layer were adjusted to 0.1 μm and 10 μm, respectively.

Example 10

A laminate was produced by the same method as in Example 1 except that the thicknesses of the adhesive layer and the sealant layer were adjusted to 1.0 μm and 40 μm, respectively.

Example 11

A laminate was produced by the same method as in Example 1 except that the thicknesses of the adhesive layer and the sealant layer were adjusted to 1.0 μm and 30 μm, respectively.

Example 12

A laminate was produced by the same method as in Example 1 except that the thicknesses of the adhesive layer and the sealant layer were adjusted to 1.0 μm and 10 μm, respectively.

Example 13

A laminate was produced by the same method as in Example 1 except that the two-part polyurethane adhesive was not applied to the base material layer, and the adhesive resin layer and the barrier layer were not provided.

Comparative Example 1

A laminate was produced by the same method as in Example 1 except that the ozone treatment was not performed in the extrusion laminating method.

Comparative Example 2

A laminate was produced by the same method as in Example 1 except that the thickness of the sealant layer was adjusted to 50 μm.

Comparative Example 3

A laminate was produced by the same method as in Example 1 except that the thickness of the sealant layer was adjusted to 5 μm.

Comparative Example 4

A laminate was produced by the same method as in Example 1 except that the thickness of the adhesive layer was adjusted to be less than 0.1 μm.

Comparative Example 5

A base material layer and a barrier layer were prepared in the same manner as in Example 1. Next, a two-part polyurethane adhesive was applied to one main surface of the base material layer, and subsequently, the base material layer and the barrier layer were laminated such that the main surface and the barrier layer faced each other.

Next, a polyurethane adhesive (dry lamination adhesive D) was applied to the surface of the barrier layer to form an adhesive layer so as to have a thickness of 0.5 μm, and subsequently, the barrier layer and the sealant layer were laminated such that the main surface and the sealant layer faced each other. Specifically, a sealant layer made of a COC resin and having been subjected to corona treatment was separately prepared and laminated.

Comparative Example 6

A laminate was produced by the same method as in Example 1 except that as the raw material of the sealant layer, a mixture containing the COC resin and LDPE used in Example 1 at a mass ratio of 9:1 was used. LDPE was found to have a melt flow rate of 7.0 g/10 min at 190° C. with a load of 21.168N (=2.16 kgf), a density of 0.918 g/cm³, and a melting point of 106° C.

Comparative Example 7

A laminate was produced by the same method as in Example 1 except that a sealant layer having a two-layered structure was formed as follows. That is, a sealant layer including a layer made of LLDPE and having a thickness of 10 μm and a layer made of a COC resin and having a thickness of 20 μm provided thereon was formed on the adhesive layer by an extrusion laminating method. LLDPE was found to have a melt flow rate of 9.0 g/10 min at 190° C. with a load of 21.168 N (=2.16 kgf), a density of 0.912 g/cm³, and a melting point of 120° C. The same raw material of the COC resin as that used in Example 1 was used.

Comparative Example 8

A laminate was produced by the same method as in Example 1 except that a sealant layer having a two-layered structure was formed as follows. That is, a sealant layer including a layer made of LLDPE and having a thickness of 10 μm and a layer made of a COC resin and having a thickness of 5 μm provided thereon was formed on the adhesive layer by an extrusion laminating method. The same LLDPE as that used in Comparative Example 7 was used. The same raw material of the COC resin as that used in Example 1 was used.

Comparative Example 9

A laminate was produced by the same method as in Example 1 except that a sealant layer having a two-layered structure was formed as follows. That is, a sealant layer including a layer made of a COC resin and having a thickness of 20 μm, and a layer made of LLDPE having a thickness of 10 μm provided on the sealant layer was formed on the adhesive layer by an extrusion laminating method. The same LLDPE as that used in Comparative Example 7 was used. The same raw material of the COC resin as that used in Example 1 was used.

Comparative Example 10

A base material layer and a barrier layer were prepared in the same manner as in Example 1. Next, a two-part polyurethane adhesive was applied to one main surface of the base material layer, and subsequently, the base material layer and the barrier layer were laminated such that the main surface and the barrier layer faced each other.

Next, a polyurethane adhesive (dry lamination adhesive D) was applied to the surface of the barrier layer to form an adhesive layer so as to have a thickness of 2.5 μm, and subsequently, the barrier layer and the sealant layer were laminated such that the main surface and the sealant layer faced each other. Specifically, a sealant layer subjected to corona treatment was separately prepared and laminated.

<Evaluation>

Bags having dimensions of 10 cm in length and 10 cm in width were produced from the laminates according to Examples 1 to 13 and Comparative Examples 1 to 10. Next, these bags were filled with a patch and sealed by heat sealing. Next, the packaged articles thus obtained were left to stand at room temperature for a certain period of time, and thereafter, it was confirmed whether or not active ingredients of the patch were adsorbed to the sealant layer of each of the laminates.

In addition, the adhesion strength between the barrier layer and the sealant layer was examined for the laminates according to Examples 1 to 13 and Comparative Examples 1 to 10. First, test pieces each having a dimension of 15 mm in width and 10 cm in length were cut out from the laminate according to Example 1, and for each of these test pieces, the adhesion strength [N/15 mm] between the barrier layer and the sealant layer was measured using a method conforming to the peeling method described in JIS K6854-3:1999. Specifically, these test pieces were subjected to peeling at a tensile speed of 300 mm/min. In addition, the adhesion strength of the laminates according to Examples 2 to 13 and Comparative Examples 1 to 10 was measured in the same manner as that performed for the laminate according to Example 1.

The measurement results are summarized in Tables 1 and 2 below.

TABLE 1

| | Configuration | Production method | Surface treatment | Adhesive layer Type | Thickness [μm] | Thickness [μm] of COC layer | Thickness [μm] of LLDPE layer | Non-absorbing property | Adhesion strength [N/15 mm] | Film-forming property | Cost | Overall judgement |
|---|---|---|---|---|---|---|---|---|---|---|---|---|
| Ex. 1 | PET/AC agent/PE/AL/ Adhesive layer/COC | Extrusion lamination | Ozone treatment | Anchor coating agent A | 0.5 | 30 | — | ○ | 3.0 ○ | ○ | ○ | ○ |
| Ex. 2 | PET/AC agent/PE/AL/ Adhesive layer/COC | Extrusion lamination | Ozone treatment | Anchor coating agent B | 0.5 | 30 | — | ○ | 3.0 ○ | ○ | ○ | ○ |
| Ex. 3 | PET/AC agent/PE/AL/ Adhesive layer/COC | Extrusion lamination | Ozone treatment | Anchor coating agent C | 0.5 | 30 | — | ○ | 1.0 ○ | ○ | ○ | ○ |

TABLE 1-continued

|  | Configuration | Production method | Surface treatment | Adhesive layer Type | Adhesive layer Thickness [μm] | Thickness [μm] of COC layer | Thickness [μm] of LLDPE layer | Non-absorbing property | Adhesion strength [N/15 mm] | Film-forming property | Cost | Overall judgement |
|---|---|---|---|---|---|---|---|---|---|---|---|---|
| Ex. 4 | PET/AC agent/PE/AL/ Adhesive layer/COC | Extrusion lamination | None | Anchor coating agent C | 0.5 | 30 | — | ○ | 1.0 ○ | ○ | ○ | ○ |
| Ex. 5 | PET/AC agent/PE/AL/ Adhesive layer/COC | Extrusion lamination | Ozone treatment | Anchor coating agent A | 0.5 | 40 | — | ○ | 3.5 ○ | ○ | ○ | ○ |
| Ex. 6 | PET/AC agent/PE/AL/ Adhesive layer/COC | Extrusion lamination | Ozone treatment | Anchor coating agent A | 0.5 | 10 | — | ○ | 1.5 ○ | Δ | ○ | ○ |
| Ex. 7 | PET/AC agent/PE/AL/ Adhesive layer/COC | Extrusion lamination | Ozone treatment | Anchor coating agent A | 0.1 | 40 | — | ○ | 1.5 ○ | ○ | ○ | ○ |
| Ex. 8 | PET/AC agent/PE/AL/ Adhesive layer/COC | Extrusion lamination | Ozone treatment | Anchor coating agent A | 0.1 | 30 | — | ○ | 1.0 ○ | ○ | ○ | ○ |
| Ex. 9 | PET/AC agent/PE/AL/ Adhesive layer/COC | Extrusion lamination | Ozone treatment | Anchor coating agent A | 0.1 | 10 | — | ○ | 0.8 ○ | Δ | ○ | ○ |
| Ex. 10 | PET/AC agent/PE/AL/ Adhesive layer/COC | Extrusion lamination | Ozone treatment | Anchor coating agent A | 1.0 | 40 | — | ○ | 4.0 ○ | ○ | ○ | ○ |
| Ex. 11 | PET/AC agent/PE/AL/ Adhesive layer/COC | Extrusion lamination | Ozone treatment | Anchor coating agent A | 1.0 | 30 | — | ○ | 3.5 ○ | ○ | ○ | ○ |
| Ex. 12 | PET/AC agent/PE/AL/ Adhesive layer/COC | Extrusion lamination | Ozone treatment | Anchor coating agent A | 1.0 | 10 | — | ○ | 2.0 ○ | Δ | ○ | ○ |
| Ex. 13 | PET/Adhesive layer/ COC | Extrusion lamination | Ozone treatment | Anchor coating agent A | 0.5 | 30 | — | ○ | 2.5 ○ | ○ | ○ | ○ |

TABLE 2

|  | Configuration | Production method | Surface treatment | Adhesive layer Type | Adhesive layer Thickness [μm] | Thickness [μm] of COC layer | Thickness [μm] of LLDPE layer | Non-adsorbing property | Adhesion strength [N/15 mm] | Film-forming property | Cost | Overall judgement |
|---|---|---|---|---|---|---|---|---|---|---|---|---|
| Comp. Ex. 1 | PET/AC agent/PE/AL/ Adhesive layer/COC | Extrusion lamination | None | Anchor coating agent A | 0.5 | 30 | — | ○ | <0.1 X | ○ | ○ | X |
| Comp. Ex. 2 | PET/AC agent/PE/AL/ Adhesive layer/COC | Extrusion lamination | Ozone treatment | Anchor coating agent A | 0.5 | 50 | — | ○ | 3.5 ○ | ○ | X | X |
| Comp. Ex. 3 | PET/AC agent/PE/AL/ Adhesive layer/COC | Extrusion lamination | Ozone treatment | Anchor coating agent A | 0.5 | 5 | — | X | 0.5 Δ | X | ○ | X |
| Comp. Ex. 4 | PET/AC agent/PE/AL/ Adhesive layer/COC | Extrusion lamination | Ozone treatment | Anchor coating agent A | <0.1 | 30 | — | ○ | <0.1 X | ○ | ○ | X |
| Comp. Ex. 5 | PET/DL adhesive/AL/ Adhesive layer/COC | Extrusion lamination | Corona treatment | Dry lamination adhesive D | 0.5 | 30 | — | ○ | 0.5 Δ | ○ | X | X |
| Comp. Ex. 6 | PET/AC agent/PE/AL/ Adhesive layer/ COC (LDPE 10%) | Extrusion lamination | Ozone treatment | Anchor coating agent A | 0.5 | 30 | — | X | 3.0 ○ | ○ | ○ | X |
| Comp. Ex. 7 | PET/AC agent/PE/AL/ Adhesive layer/LLDPE/ COC | Extrusion lamination | Ozone treatment | Anchor coating agent A | 0.5 | 20 | 10 | ○ | 3.0 ○ | X | ○ | X |
| Comp. Ex. 8 | PET/AC agent/PE/AL/ Adhesive layer/LLDPE/ COC | Extrusion lamination | Ozone treatment | Anchor coating agent A | 0.5 | 5 | 10 | X | 3.0 ○ | X | ○ | X |
| Comp. Ex. 9 | PET/AC agent/PE/AL/ Adhesive layer/COC/ LLDPE | Extrusion lamination | Ozone treatment | Anchor coating agent A | 0.5 | 20 | 10 | X | 3.0 ○ | X | ○ | X |
| Comp. Ex. 10 | PET/DL adhesive/AL/ Adhesive layer/COC | Dry lamination | Corona treatment | Dry lamination | 2.5 | 30 | — | ○ | 3.5 ○ | ○ | X | X |

TABLE 2-continued

| Configuration | Production method | Surface treatment | Adhesive layer Type | Adhesive layer Thickness [μm] | Thickness [μm] of COC layer | Thickness [μm] of LLDPE layer | Non-adsorbing property | Adhesion strength [N/15 mm] | Film-forming property | Cost | Overall judgement |
|---|---|---|---|---|---|---|---|---|---|---|---|
| | | | adhesive D | | | | | | | | |

In Tables 1 and 2, the column labeled "Configuration" describes the laminating order and materials of the layers constituting the laminate. Specifically, in the arrangement delimited by "/", the material of the base material layer is described on the leftmost side, and the material of the sealant layer is described on the rightmost side. "AC agent" indicates an anchor coating agent, and "DL adhesive" indicates a dry lamination adhesive.

In the column labeled "Surface treatment", "Ozone treatment" indicates that ozone treatment was performed, "Corona treatment" indicates that corona treatment was performed, and "None" indicates that no surface treatment was performed.

In the column labeled "Production method", "Extrusion lamination" indicates that a non-oriented sealant layer was formed by an extrusion laminating method, and "dry lamination" indicates that a sealant layer was formed separately and then laminated.

In the column labeled "Non-adsorbing property", "○" indicates that active ingredients of the patch were adsorbed in a very small amount to the sealant layer of the laminate. "x" indicates that active ingredients of the patch were adsorbed in a relatively large amount to the sealant layer of the laminate.

In the column labeled "Film forming property", "○" indicates that a resulting melt film caused an edge waving phenomenon or a neck-in phenomenon very little when the sealant layer was formed by an extrusion laminating method, or the sealant layer was provided by the laminating method, so that the above-mentioned problems with a melt film did not occur. "Δ" indicates that a resulting melt film caused an edge waving phenomenon or a neck-in phenomenon when the sealant layer was formed by an extrusion laminating method, but the phenomenon was of a level causing no problems. "x" indicates that a resulting melt film noticeably caused an edge waving phenomenon or a neck-in phenomenon when the sealant layer was formed by an extrusion laminating method, and was able to be processed, but it caused a large loss.

In the column labeled "Cost", "x" indicates that a high production cost was incurred due to an excessively large thickness of the adhesive layer or the sealant layer, or the provision of the sealant layer using a laminating method. "○" indicates a result other than "x", and that the production cost was low.

In the column labeled "Overall judgment", "○" indicates that the adhesion strength was 0.8 N/15 mm or more, and there was no "x" in any of "Non-adsorbing property", "Film-forming property", and "Cost". "x" indicates that the adhesion strength was less than 0.8 N/15 mm, or that "x" was present in at least one of "Non-adsorbing property", "Film forming property", and "Cost".

As shown in Tables 1 and 2, in Examples 1 to 13, the active ingredients of the content adhered very little to the sealant layer, the adhesion strength between the barrier layer and the sealant layer was excellent, and no delamination occurred. The laminates according to Examples 1 to 5, 7, 8, 10, 11, and 13 were particularly excellent in a film forming property. The laminates according to Examples 1, 2, 5, 10 and 11 were particularly excellent in adhesion strength between the barrier layer and the sealant layer of 3.0 N/15 mm or more. In addition, the production costs of Examples 1 to 13 were low.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A laminate comprising:
   a base material layer;
   an adhesive layer having a thickness in a range of 0.1 μm to 1.0 μm;
   a non-oriented sealant layer having a thickness in a range of 10 μm to 40 μm and made of a cyclic polyolefin resin; and
   a barrier layer between the base material layer and the adhesive layer, the barrier layer comprising a layer including an aluminum layer, wherein
   a first surface of the non-oriented sealant layer constitutes an outermost surface of the laminate, a second surface of the non-oriented sealant layer is bonded to the base material layer via the adhesive layer,
   an adhesion strength between the barrier layer and the non-oriented sealant layer is 0.8 N/15 mm to 4.0 N/15 mm,
   the adhesive layer is made of a two-part polyurethane adhesive, and
   the second surface of the non-oriented sealant layer is an ozone-treated surface.

2. A package comprising the laminate according to claim 1 such that the sealant layer is adjacent to a space for containing a content.

3. A packaged article comprising:
   the package according to claim 2; and
   the content contained in the package.

* * * * *

UNITED STATES PATENT AND TRADEMARK OFFICE
CERTIFICATE OF CORRECTION

| | |
|---|---|
| PATENT NO. | : 11,607,865 B2 |
| APPLICATION NO. | : 16/791603 |
| DATED | : March 21, 2023 |
| INVENTOR(S) | : Yuki Sugiyama et al. |

It is certified that error appears in the above-identified patent and that said Letters Patent is hereby corrected as shown below:

In the Specification

Column 1, Line 8, in the Cross-Reference To Related Application section, delete "2019" and insert --2018--.

Signed and Sealed this
Twenty-third Day of May, 2023

Katherine Kelly Vidal
*Director of the United States Patent and Trademark Office*